United States Patent
Numano et al.

(10) Patent No.: US 6,954,805 B2
(45) Date of Patent: Oct. 11, 2005

(54) COMPUTER DETECTING AN ACTIVATION FACTOR DUE TO A SELECTION BY A SLIDABLE SWITCH WHEN THE COMPUTER IS POWERED OFF, IN A STANDBY AND A PAUSE STATES

(75) Inventors: Fujihito Numano, Hamura (JP); Akinori Tokunaga, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/849,258

(22) Filed: May 20, 2004

(65) Prior Publication Data

US 2004/0215844 A1 Oct. 28, 2004

Related U.S. Application Data

(62) Division of application No. 09/950,076, filed on Sep. 12, 2001, now Pat. No. 6,763,400.

(30) Foreign Application Priority Data

Sep. 12, 2000 (JP) ........................................ 2000-277362
Sep. 12, 2000 (JP) ........................................ 2000-277365
Sep. 12, 2000 (JP) ........................................ 2000-277366

(51) Int. Cl.[7] ................................................ G06F 13/10
(52) U.S. Cl. ............................. 710/14; 710/8; 713/300
(58) Field of Search ........................... 710/8, 10, 14, 710/36, 62, 72, 74; 713/300, 1, 320, 2, 324, 330; 361/683

(56) References Cited

U.S. PATENT DOCUMENTS

| | | | |
|---|---|---|---|
| 5,319,618 A | | 6/1994 | Krikorian |
| 5,473,584 A | * | 12/1995 | Oshima .................... 369/47.11 |
| 5,841,742 A | | 11/1998 | Tsukihashi et al. |
| 5,854,624 A | | 12/1998 | Grant |
| 5,951,360 A | | 9/1999 | Fearon et al. |
| 5,974,333 A | | 10/1999 | Chen |
| 6,006,337 A | | 12/1999 | Koo |
| 6,038,614 A | | 3/2000 | Chan et al. |
| 6,038,672 A | * | 3/2000 | Klein .......................... 713/322 |
| 6,073,187 A | * | 6/2000 | Jacobs et al. .................. 710/14 |
| 6,445,654 B1 | | 9/2002 | Hayakawa et al. |
| 6,675,233 B1 | * | 1/2004 | Du et al. ....................... 710/14 |

FOREIGN PATENT DOCUMENTS

| | | |
|---|---|---|
| JP | 404345963 A | 12/1992 |
| WO | WO-000161442 A1 | 8/2001 |

* cited by examiner

*Primary Examiner*—Ilwoo Park
(74) *Attorney, Agent, or Firm*—Oblon, Spivak, McClelland, Maier & Neustadt, P.C.

(57) ABSTRACT

If an operating knob of a mode control switch is slide in one direction, disk medium reproduction is selected and reproduction processing of data recorded in an optical disk medium set to a CD/DVD drive is executed. If the operating knob is slid in another direction, MP3 data reproduction is selected and reproduction processing of digital audio data stored in a hard disk is executed in accordance with a play list.

1 Claim, 13 Drawing Sheets

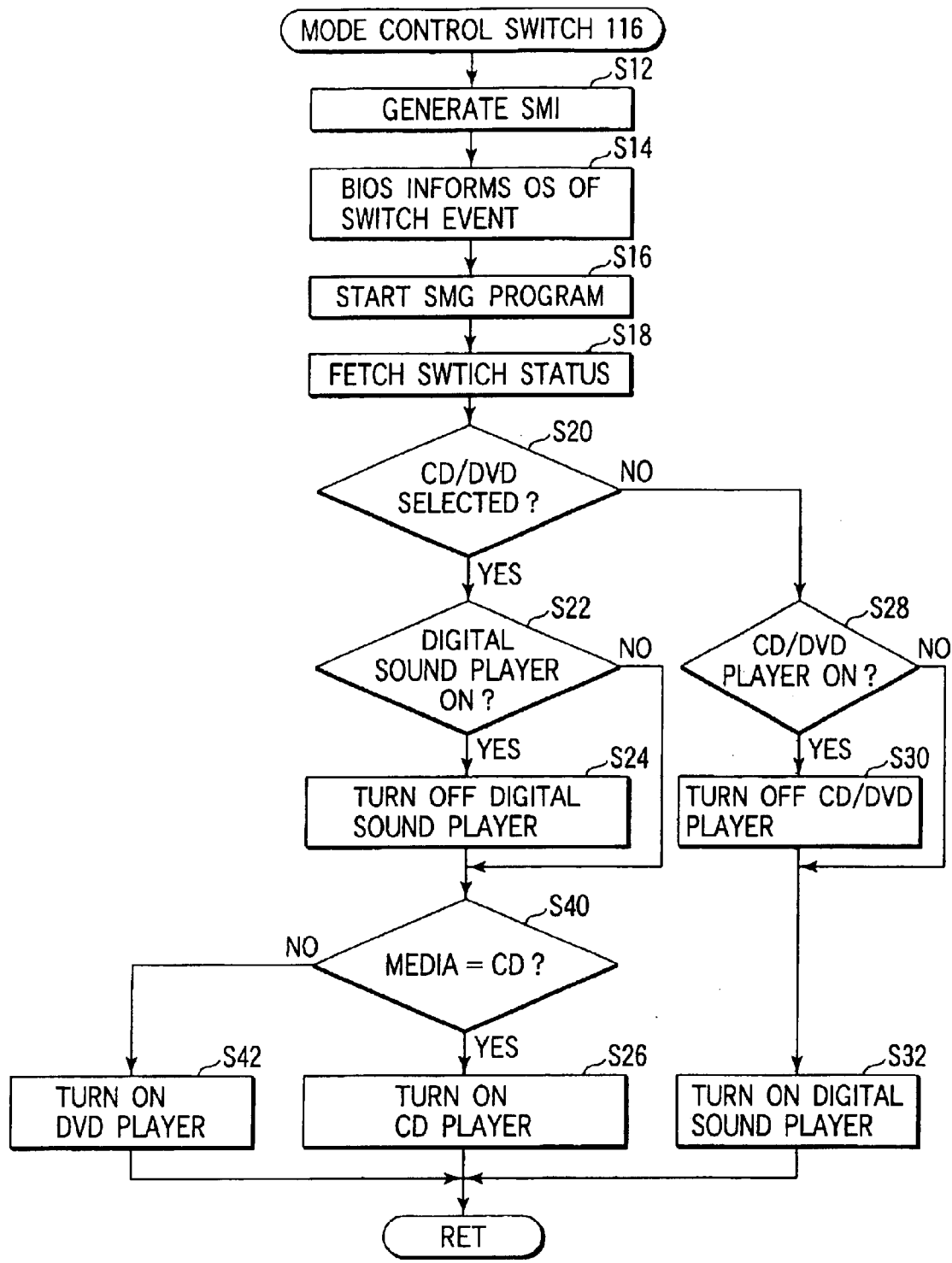
F I G. 10

COMPUTER DETECTING AN ACTIVATION FACTOR DUE TO A SELECTION BY A SLIDABLE SWITCH WHEN THE COMPUTER IS POWERED OFF, IN A STANDBY AND A PAUSE STATES

CROSS-REFERENCE TO RELATED APPLICATIONS

This application is a division of and claims the benefit of priority under 35 USC § 120 from U.S. Ser. No. 09/950,076, filed Sep. 12, 2001, now U.S. Pat. No. 6,763,400, and is based upon and claims the benefit of priority from the prior Japanese Patent Applications No. 2000-277362, filed Sep. 12, 2000; No. 2000-277365, filed Sep. 12, 2000; and No. 2000-277366, filed Sep. 12, 2000, the entire contents of all of which are incorporated herein by reference.

BACKGROUND OF THE INVENTION

1. Field of the Invention

The present invention relates to a computer having a function for reproducing multimedia data, a method for reproducing multimedia data in the computer, and a recording medium for recording a program for the reproduction.

2. Description of the Related Art

Conventionally, in a computer having a function for reproducing audio data such as MP3 data or WAVE data, a reproduction command operation is carried out by using a pointing device such as mouse, accupoint or keyboard. However, such audio data reproduction operation requires fine operation in a small sized computer which is easily hand held in particular, and therefore, there has been a problem on an aspect of operability. Further, in a small sized computer of such type, a user must carry out button operation or the like due to specification of a coordinate position while a display panel is opened, that is, while a pointing device operation or keyboard operation and the like is enabled. Thus, operating environment is specifically limited, and there has been a problem on an aspect of usability.

This applies to a computer having a function for reproducing compressed video data such as MPEG data.

BRIEF SUMMARY OF THE INVENTION

According to an embodiment of the present invention, there are provided a computer capable of easily and speedily making an operation for reproducing multimedia data, a method for reproducing multimedia data in the computer, and a recording medium storing that reproduction program.

According to one aspect of the present invention, in a computer having a function for reproducing multimedia data, there are provided a switch at a main frame of a computer main body and a program section that determines the contents of operation of the switch, and activates a multimedia data player application program.

Therefore, it is possible to reproduce multimedia data speedily and easily with a simple operation or make an operation for switching a reproduction target without using an input device such as keyboard or pointing device, and therefore, without requiring fine operation, and without operating environment being specifically operated.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 10 is a flow chart showing procedures for executing an audio data reproduction function of a personal computer according to a second embodiment of the present invention;

DETAILED DESCRIPTION OF THE INVENTION

An embodiment of a computer having a function for reproducing multimedia data according to the present invention will now be described with reference to the accompanying drawings. Multimedia data targeted for reproduction includes audio (sound) data and video data (moving picture and still picture). Here, audio data is targeted for reproduction. Although a description of video data reproduction is omitted here, such video data can be reproduced similarly.

First Embodiment

Figure 1:
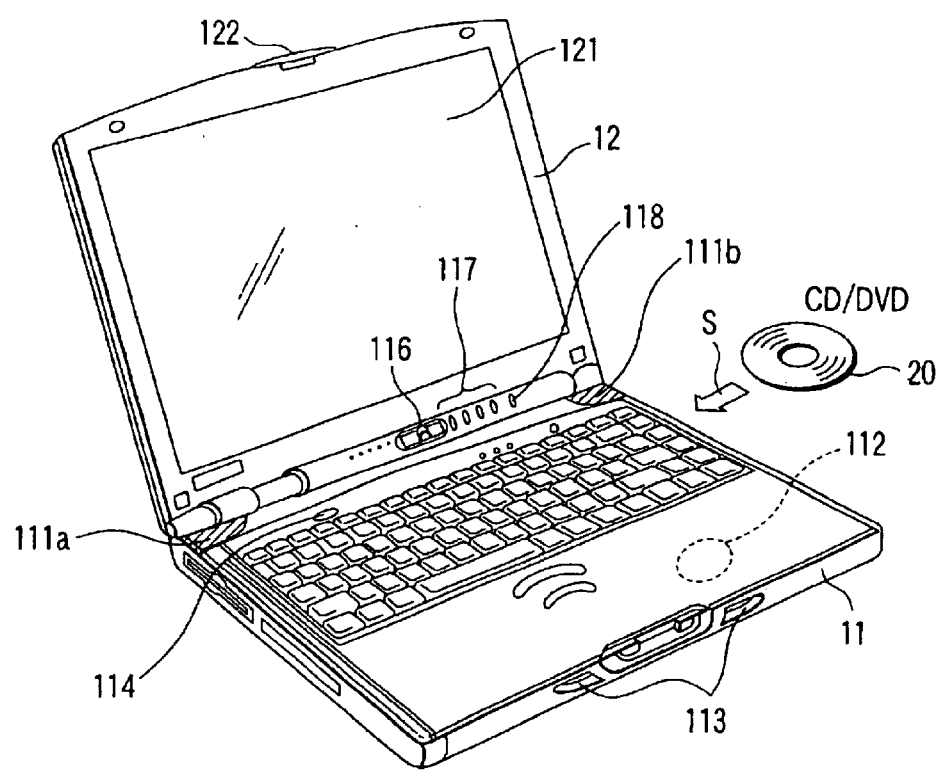
FIG. 1 is a perspective view showing an external configuration of a personal computer according to a first embodiment of the present invention while a display is opened.
Figure 2:
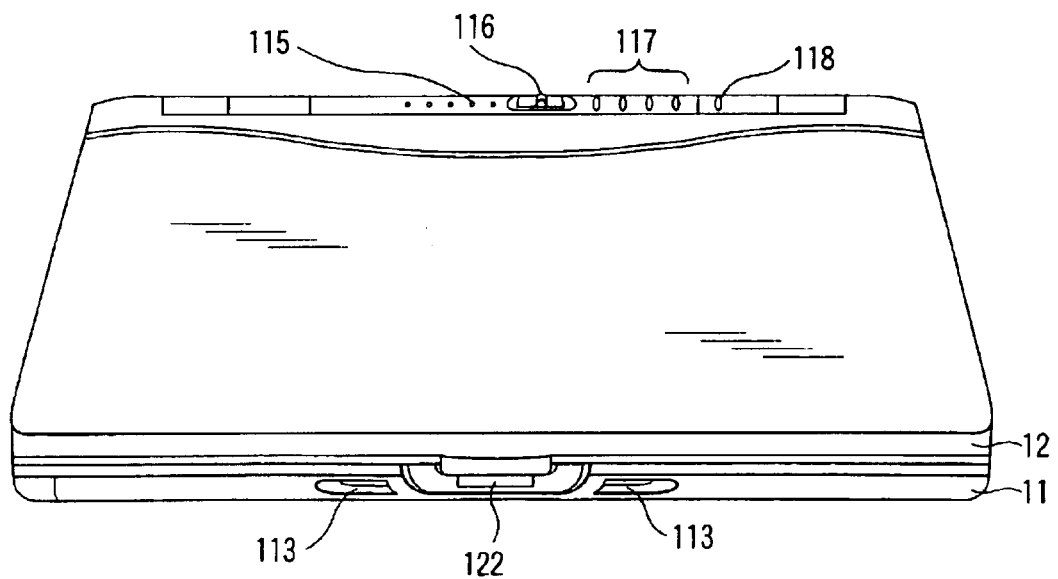
FIG. 2 is a perspective view showing an external configuration of the computer according to the first embodiment while the display is closed.
Figure 3:
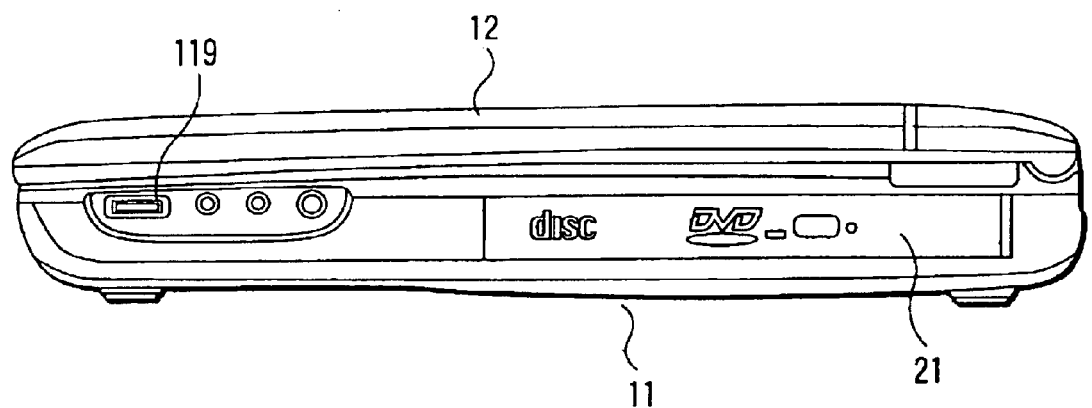
FIG. 3 is a side view showing an external configuration of the computer according to the first embodiment while the computer display is closed.

A basic structure of a notebook type personal computer that can be hand held according to the first embodiment of the present invention will be described with reference to FIGS. 1 to 3. FIG. 1 is a front view of the computer while a display unit is opened. FIG. 2 is a front view of the computer while the display unit is closed. FIG. 3 is a side view when the display unit is viewed from a direction indicated by the arrow S in FIG. 1 while the display unit is closed.

This computer comprises a computer main body 11 and the display unit 12.

The display unit 12 incorporates a display screen 121 comprising an LCD. The display unit 12 is mounted turnably between an opened position and a closed position relevant to the computer main body 11.

The computer main body 11 comprises a thin box shaped main frame, and a keyboard and pointing device or the like are disposed on the top face of the main frame.

An L channel stereo speaker 111a and an R channel stereo speaker 111b are disposed separately at the left and right of the distal end on the top face of the computer main body 11. The stereo speaker 111a and 111b function as main speakers of the computer, and is mainly used for middle/high tone reproduction. The L channel stereo speaker 111a is disposed so that a part of this speaker reaches the left side face of the computer main body 11. The R channel stereo speaker 111b as well is disposed so that a part of this speaker reaches the right side face of the computer main body 11. This is because sounds from the stereo speakers 111a and 111b can be transmitted to the outside even while the display unit 12 is closed.

A sub woofer 112 for low tone output is provided in the computer main body 11. The sub woofer 112 can improve the performance of reproducing a low tone that is hardly reproduced well by a main speaker (stereo speakers 111a and 111b). The sub woofer 112 is disposed in the main frame of the computer main body 11 so that its front face is oriented to the bottom face side of the computer main body 11.

On the front face of the computer main body 11, as illustrated, bass reflex openings 113 are provided at positions on both of the left and right sides of a receiver portion of a display latch 122. The bass reflex openings 113 are used for outputting sounds at the rear face side of the sub woofer 112. The sound at the rear face side of the sub woofer 112 is directly generated from the front face of the computer main body 11 to a user through the bass reflex openings 113.

On the top face of the computer main body 11, apart from a power button 114 that is a power switch of the computer main body 11, there are provided a system indicator 115, a mode control switch (momentary switch) 116, an audio/video (A/V) control button 117, and a bass boost button 118. These system indicators 115, mode control switch 116, A/V control button 117, and bass boost button 118 are disposed so as to be exposed to the outside even while the display panel 12 is closed, as shown in FIG. 2. In the present embodiment, a cutout is provided between left and right hinges beneath the display panel 12. In this manner, even while the display panel 12 is closed, a region at the distal end on the top face of the computer main body 11 is configured so as to be exposed to the outside.

The system indicator 115 includes a plurality of LEDS. When these LEDs light, it displays a variety of statuses such as power on/off state, HDD access state, AC adapter connection or disconnection.

Figure 4:
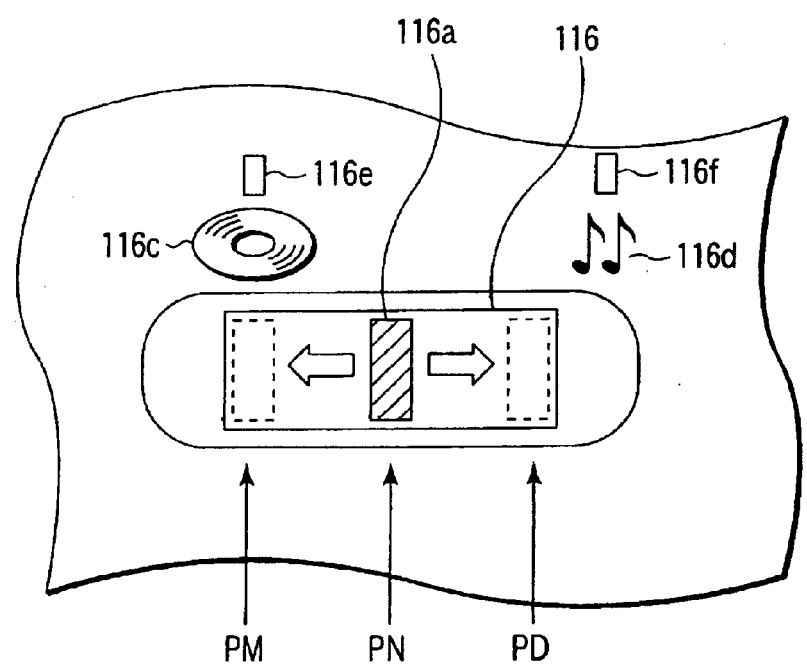
FIG. 4 is an enlarged view showing an operating section of a mode control switch (momentary switch) of the first embodiment.

FIG. 4 is an enlarged view showing an operating section of the mode control switch (momentary switch) 116. In the present embodiment, audio data targeted for reproduction includes two types of disk media audio data stored in an optical disk medium such as a CD or DVD and audio data stored in a hard disk or memory card. The mode control switch 116 is a single hardware switch that selects either of these two types of audio data as a reproduction target, and instructs reproduction. As shown in FIG. 4, an operating knob 116a employs a switch called a momentary switch structured so as to be slidable in a transverse direction, and is restored to a neutral position PN when no load is applied. In instructing reproduction of disk media audio data recorded in an optical disk medium such as a CD and DVD, the operating knob 116a is operated at a slide position PM in a left direction. In instructing reproduction of audio data such as MP 3 data stored in the hard disk or memory card, the operating knob 116a is operated at a slide position PD in a right direction.

A disk design icon 116c that denotes reproduction of data stored in disk media shown at the slide position PM in the left direction of the operating knob 116a is printed on the face of the main frame at which the mode control switch 116 is provided. A music note design icon 116d that denotes reproduction of audio data stored in the hard disk or memory card shown at the slide position PD in the right direction of the operating knob 116a is printed. LEDs 116e and 116f indicating the selection results of the momentary switch 116 are provided in the vicinity of both of the icons 116c and 116d.

The mode control switch 116 can be operated while the display panel 12 is closed, and functions efficiently even while the computer main body 11 is powered off.

The operating knob 116a of the mode control switch 116 is operated at the slide position PD in the right direction, whereby an SMI (System Management Interrupt) in accordance with the switch operation occurs, and is notified to a CPU 201. On software, due to an occurrence of an SMI, an event indicating a slide operation of the mode control switch 116 is generated from a BIOS (Basic Input/Output System) to an OS (Operating System). Operating power is always supplied to an embedded controller 209 irrespective of whether the power switch is turned on/off. When the power is turned off, a specific input/output state including the mode control switch 116 is monitored.

The mode control switch 116 is operated to be set to the position PM, enabling a disk media reproduction mode in which reproduction of data stored in optical disk media such as a CD-ROM and DVD-ROM can be achieved by using the built-in CD/DVD drive 21. At this time, the mode control switch 116 is operated to be set to the position PM, whereby operating power is supplied to an audio circuit that includes a sound controller 203 shown in FIG. 5 described later, making it possible to reproduce audio data stored in the optical disk media such as a CD-ROM or DVD-ROM using the built-in CD/DVD drive 21.

The A/V control buttons 117 comprise hardware switches respectively, and are operating buttons for controlling audio/video reproduction of audio data stored in the hard disk or memory card and disk media data. These buttons include a "reproduction stop" button, "forward skipping" button and "reverse skipping" button or the like.

The bass boost button 118 is an operating button for varying an output volume level of a low tone from the sub woofer. The bass boost button 118 is operated, thereby making it possible to increase the output volume level of the low tone from the sub woofer 112 (low tone emphasis: bass boost on) or release a bass boost (bass boost off). That is, in the present embodiment, there is provided a bass boost function for variably setting the output volume level of the low tone according to an operation of the bass boost button 118. In the case where the bass boost function is turned on, the output volume level of the low tone from the sub woofer 112 can be increased more significantly than in the case where the bass boost function is turned off. In this case, only the output volume level of the low tone from the sub woofer 112 is increased, and the output volume level of the middle/high tone from the sub woofer 112 does not change. This is because a balance between the output volume of the middle/high tone from a main speaker (stereo speakers 111a and 111b) and the output volume of the middle/high tone from the sub woofer 112 is kept even when bass boost is on.

As shown in FIG. 4, a volume controller 119 and the CD/DVD drive 21 for driving a disk medium such as a CD or DVD are provided on the left side face of the computer main body 11, and a headphone jack, a microphone jack, and a video output jack or the like are provided on the left side face of the computer main body 11.

The volume controller 119 is used for controlling the output volume of the entire composite speaker system comprising the main speaker (stereo speakers 111a and 111b) and the sub woofer 112.

A disk medium 20 such as a CD-ROM having audio data recorded therein or DVD-ROM having audio and video data recorded therein can be mounted as a reproduction target.

Figure 5:
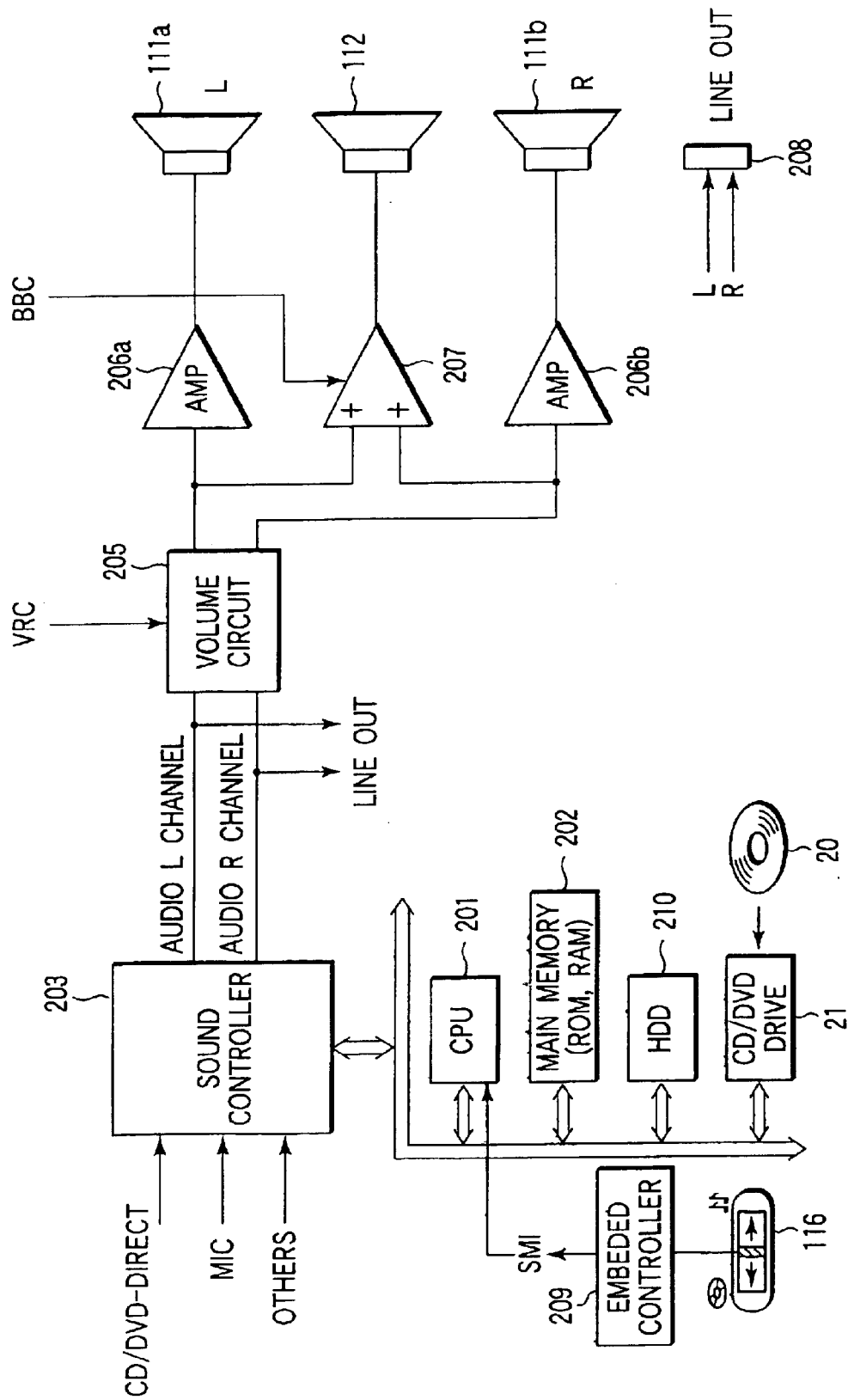
FIG. 5 is a block diagram showing a computer system configuration according to the first embodiment.

FIG. 5 is a block diagram showing a computer system configuration according to the present embodiment.

At this computer, as illustrated, the CD/DVD drive 21, a CPU 201, a main memory (ROM and RAM) 202, the embedded controller 209, and a hard disk unit (HDD) 210 or the like are provided to be connected to each other via a system bus. In addition, there are provided a sound controller 203, a volume circuit 205, an L channel main speaker amplifier (AMP) 206a, an R channel main speaker amplifier 206b, and sub woofer amplifier 207 or the like.

In a disk media reproduction mode due to operation for setting the mode control switch 116 to the position PM when the power is turned off, power is supplied to the CD/DVD drive 21, sound controller 203, volume circuit 205, L channel main speaker amplifier 206a, R channel main speaker amplifier 206b, and sub woofer amplifier 207, and no power is supplied to other sections.

The sound controller 203 inputs a variety of audio data such as audio signal CD/DVD-direct read out from the CD/DVD drive 21, an input signal MIC from a microphone, or MP3 data supplied from the hard disk unit 210, for example, through the CPU 201. According to these inputs, an L channel audio signal (Audio L channel) and an R channel audio signal (Audio R channel) are outputted. The L channel audio signal and R channel audio signal are supplied to a line-out terminal 208 for connecting an external audio device, and are supplied to the L channel main speaker amplifier 206a, R channel main speaker amplifier 206b, and sub woofer amplifier 207 through a volume circuit 205.

The volume circuit 205 is a circuit for controlling the output volume from the main speakers 111a and 111b and sub woofer 112, and increases or decreases a signal level of the L channel audio signal and R channel audio signal according to a volume control signal from the volume controller 119 described above.

The L channel main speaker amplifier 206a is adapted to drive the L-side stereo speaker 111a. This amplifier 206a amplifies an L channel audio signal inputted via the volume circuit 205, and outputs the amplified signal to the stereo speaker 111a. The R channel main speaker amplifier 206b is adapted to drive the R-side stereo speaker 111b. This amplifier 206b amplifies an R channel audio signal inputted via the volume circuit 205, and outputs the amplifies signal to the stereo speaker 111b.

The sub woofer amplifier 207 is adapted to drive the sub woofer 112. This amplifier 207 incorporates a low pass filter for reproducing only a low tone from the sub woofer amplifier 207. An L channel audio signal and an R channel audio signal both are inputted to the sub woofer amplifier 207 via the volume circuit 205. In the sub woofer amplifier 207, synthesization of the L channel audio signal and R channel audio signal (signal mixture) is carried out, and its synthesized signal is amplified and outputted to the sub woofer 112.

The sub woofer amplifier 207 incorporates a gain control mechanism for switching the output volume level of the low tone from the sub woofer 112 according to a bass boost control signal from the bass boost button 118. This gain control mechanism is configured so as to change only a gain relevant to the low tone of an input signal and so as not to factor the gain to be changed to the middle/high tone of the input signal irrespective of whether bass boost is turned on/off.

Figure 6:
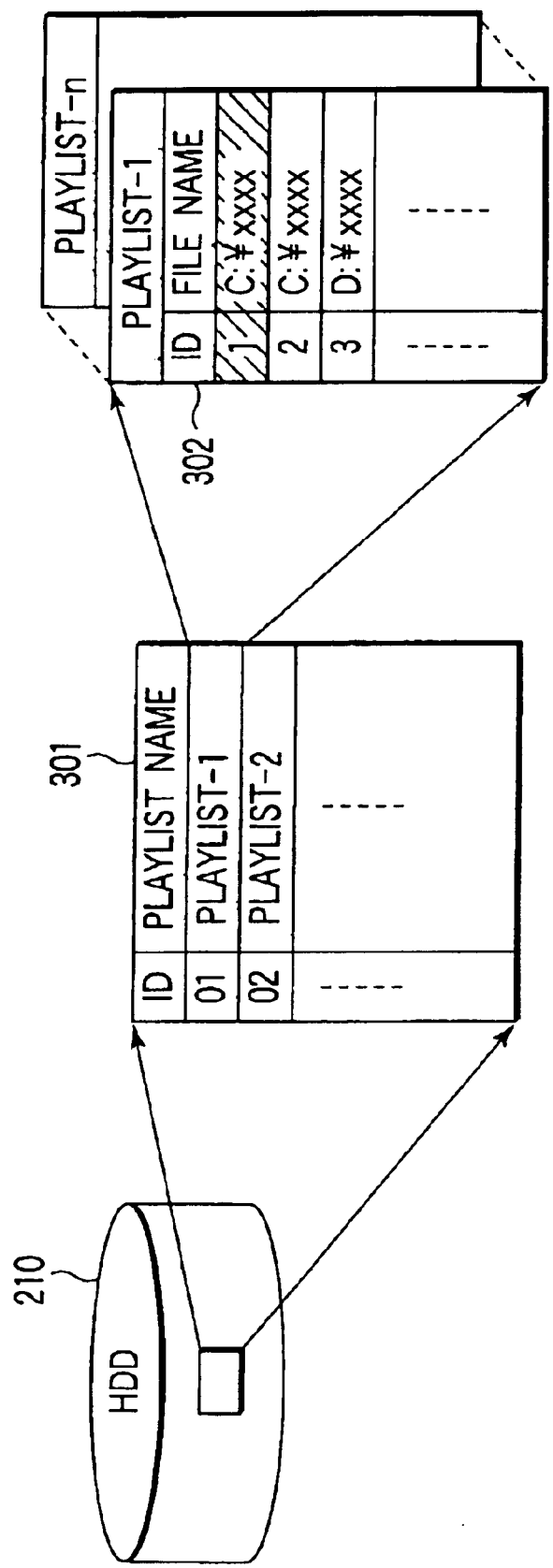
FIG. 6 is a view showing a management mechanism of a play list of the first embodiment.

FIG. 6 is a view showing a management mechanism of a play list in which audio data targeted for reproduction is arbitrarily set and registered in order of reproduction. This management mechanism is achieved by a play list management table 301 for managing a plurality of play lists (or single play list) and the plurality of play lists 302 managed by the play list management table 301.

The play lists 302 are stored in the hard disk unit 210. Then, the play list 302 selected as a use target is loaded from the hard disk unit 210 to the main memory 202, and is referred to during reproduction control. The play list 302 managed by the play list management table 301 can be edited by arbitrarily calling it.

In the present embodiment, while in reproduction of audio data in accordance with the play list 302, information at the final reproduction on the play list 302 (here, ID information contained in file reproduced at the final reproduction) is maintained in a predetermined register. The content (ID information) of this registor is updated at the end of a next reproduction. Although this register for maintaining information (ID information) at the end of reproduction may be provided anywhere, for example, it is possible to provide flag registors in fields of the play list 302, and set a flag of a predetermined value there. Here, assume that a flag register is maintained in a predetermined register region of the main memory 202 as an example.

Figure 7:
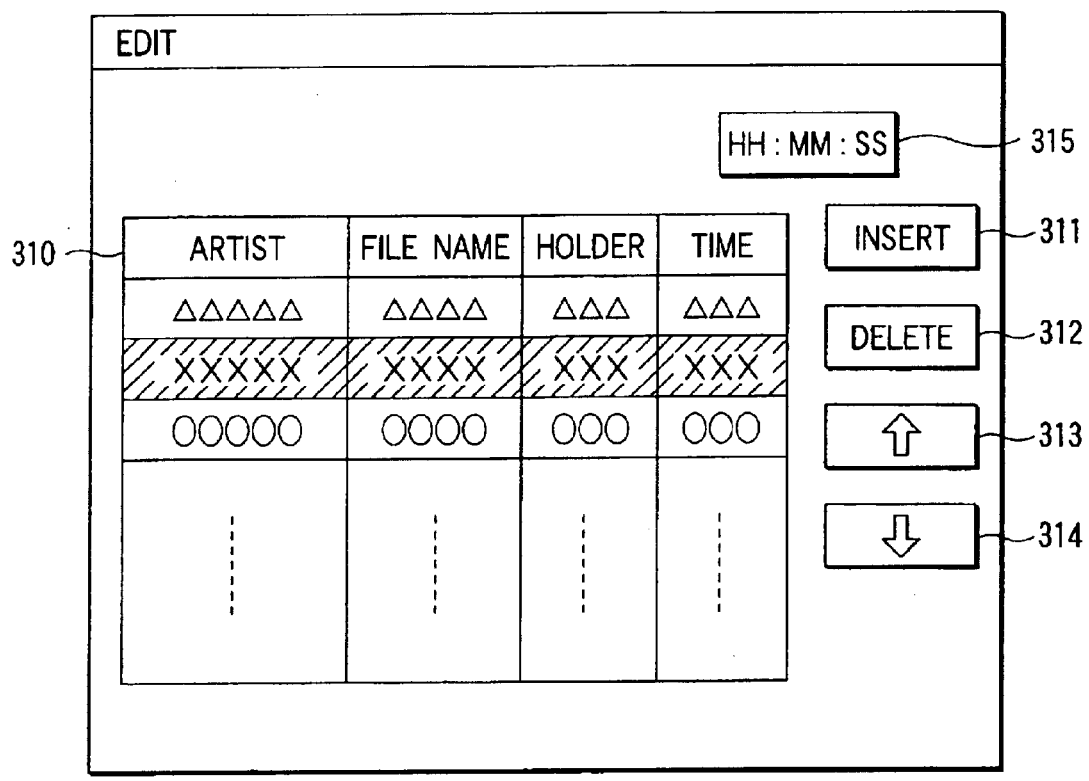
FIG. 7 is a view showing an example of a play list edit screen according to the first embodiment.

FIG. 7 shows an example of an edit screen of the play list 302, where an artist name, a file name and a folder name or the like for specifying a place for storing data targeted for reproduction are registered for each item of reproduction information (contents) in a play list main body 310. In addition, on the play list edit screen, there are provided an add button 311 for adding information concerning contents in the play list main body 310, a delete button 312 for deleting information on contents from the play list main body 310, a move button 313 for moving information on contents upwardly of the list, a move button 314 for moving the information downward of the list, and a display section 315 or the like for displaying a time for reproducing contents currently reproduced during reproduction (time clocked from the start) or the remaining time. In this example, the display section 315 for displaying the remaining time or the like is provided. This example shows an example of configuration in which an information field targeted for editing or reproduction is displayed in reverse video. This edit screen 315 can be arbitrarily created by a user in consideration of usability, and therefore, the display format, button allocation, and button functions or the like are not specified.

Figure 8:
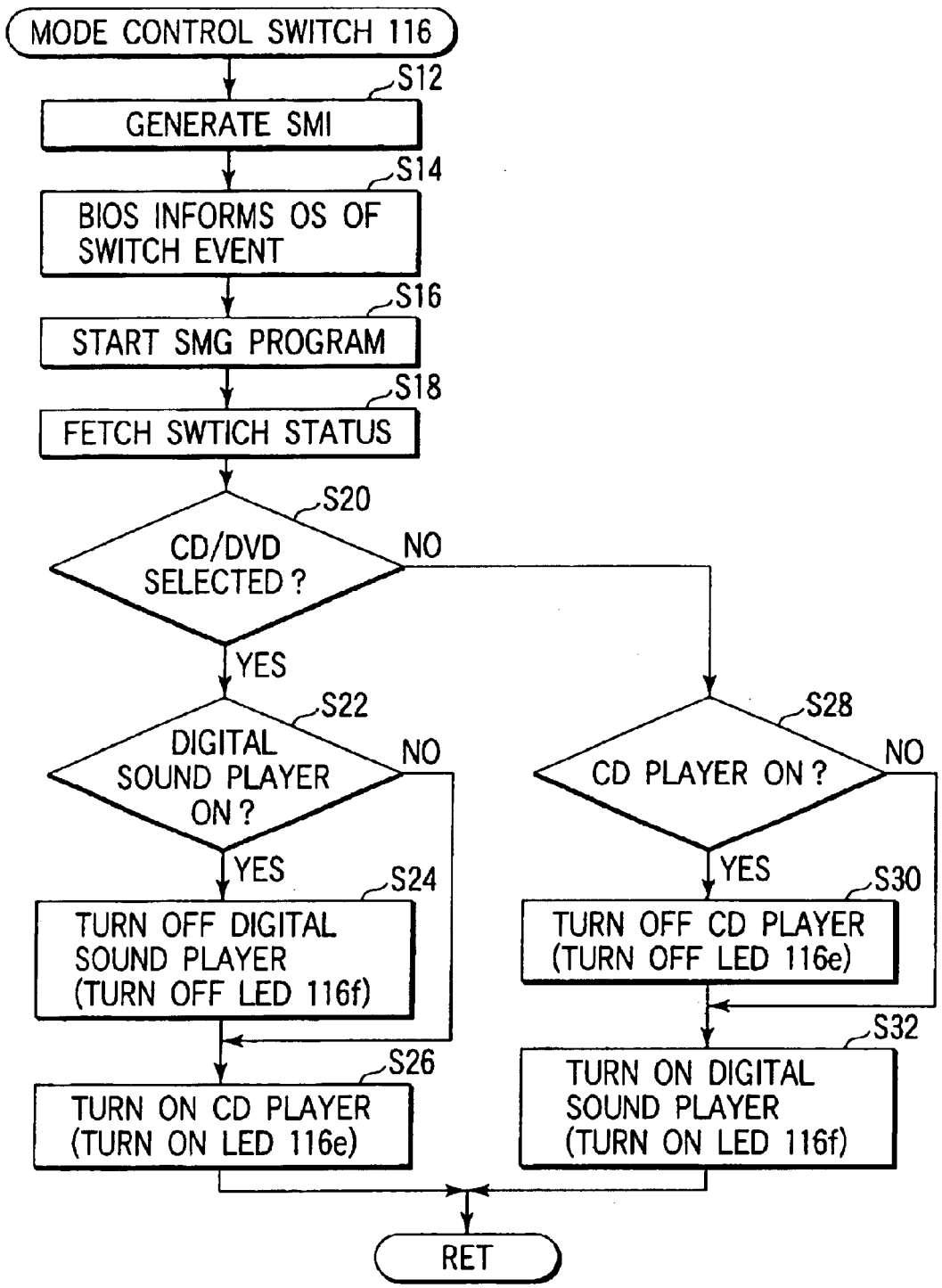
FIG. 8 is a flow chart showing procedures for executing an audio data reproduction function of the computer according to the first embodiment.

FIG. 8 is a flow chart showing procedures for executing audio data reproduction function of a personal computer according to the first embodiment of the present invention.

By operation of the mode control switch 116, on hardware, at step S12, an SMI in accordance with the switch operation is generated by means of the embedded controller 209, and the interrupt is notified to the CPU 201. On software, at step S14, due to generation of the above SMI, an event indicating the above slide operation of the mode control switch 116 is generated for a program (referred to as an SMG program) managing button operation from the BIOS via the OS. At step S16, the SMG program is initiated. At step S18, the SMG program inquires the contents of operation of the switch 116 to the BIOS, and acquires the contents of operation of the above mode control switch 116. At step S20, it is determined whether or not the current mode is a CD/DVD reproduction mode (operating the operating knob 116a to be set to the slide position PM in left direction) or an MP3 reproduction mode (operating the operating knob 116a to be set to the slide position PD in right direction).

When the reproduction mode is the CD/DVD reproduction mode, at step S22, it is determined whether or not a digital sound player for reproducing MP3 data (a digital sound player application program) is in reproduction. When the digital sound player is in reproduction, at step S24, reproduction of the digital sound player is stopped (the LED 116f is turned off), and at step S26, a CD player (a CD player application program) is initiated (the LED 116e is turned on). In the case where the digital sound player is not in reproduction at step S22, the CD player is initiated immediately at step S26.

On the other hand, in the case where the reproduction mode is the MP3 reproduction mode at step S20, it is determined whether or not the CD player is in reproduction at step S28. When the CD player is in reproduction, at step S30, reproduction of the CD player is stopped (the LED 116e is turned off). At step S32, the digital sound player is initiated (the LED 116f is turned on). In the case where it is determined that the CD player is not in reproduction at step S28, the digital sound player is initiated immediately at step S32.

Figure 9:
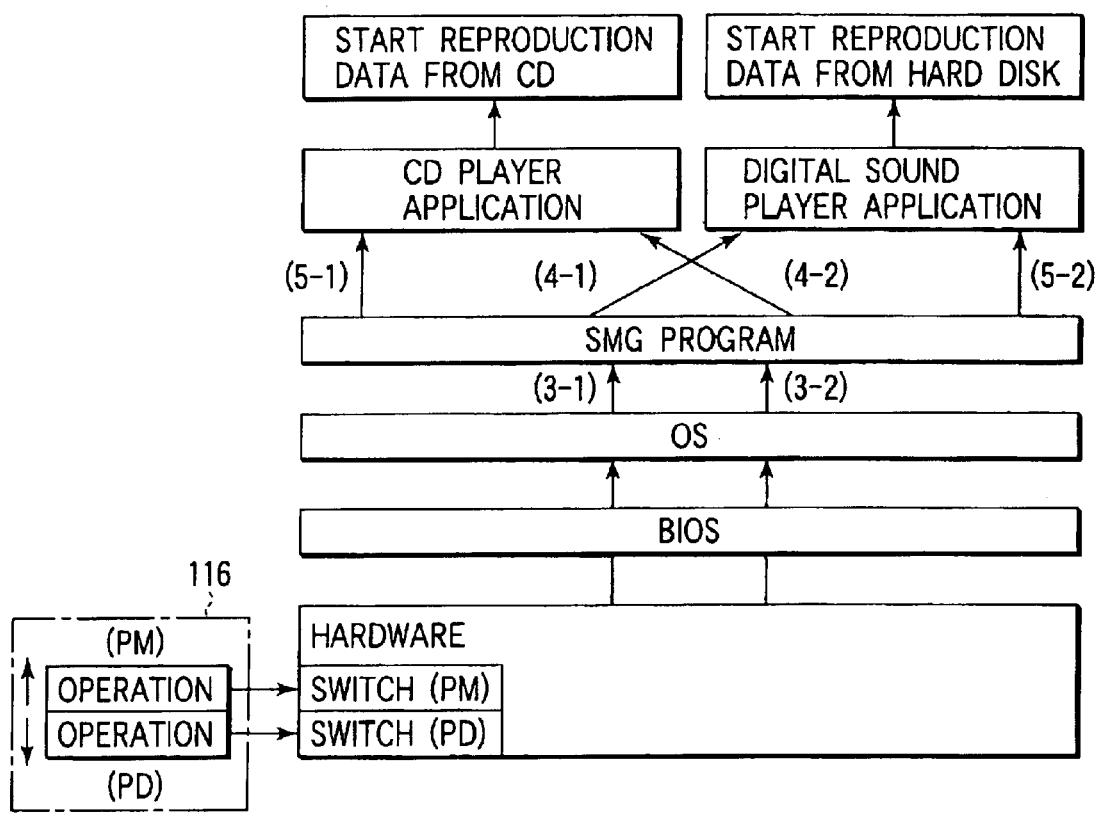
FIG. 9 is a view showing a flow of reproduction processing according to the first embodiment.

FIG. 9 is a view showing a flow of reproduction processing according to the first embodiment. When the mode control switch 116 is operated during system operation, the switch operation is notified from the BIOS to the SMG program via the OS. Upon the receipt of the above notification, the SMG program initiates a player application program (CD player application/digital sound player application) targeted to be reproduced in accordance with the contents of operation of the switch. In the present embodiment, CD media mountable on the CD/DVD drive 21 include media having compressed audio data or audio/video data recorded therein.

Specifically, when the mode control switch 116 is operated, the switch operation state is notified from the BIOS to the SMG program via the OS, and the SMG program inquires the BIOS for the contents of switch operation (inquires a switch operation event). In this manner, it is recognized whether or not the current mode is the CD/DVD reproduction mode (operating the operating knob 116a to set to the slide position PM in left direction) or MP3 reproduction mode (operating the operating knob 116a to be set to the slide position PD in right direction).

When the current mode is the CD/DVD reproduction mode ((3-1) in FIG. 9), it is determined whether or not the disk medium is in reproduction. Otherwise, it is determined whether or not the digital sound player is in reproduction operation (in reproduction processing under the control of the digital sound player application program). When the digital sound player is in reproduction operation, the operation is controlled to be stopped ((4-1) in FIG. 9), and the CD player (the CD player application program) is initiated for reproduction ((5-1) in FIG. 9).

In addition, when the current mode is the MP3 reproduction mode ((3-2) in FIG. 9), it is determined whether or not the digital sound player is in operation. If the digital sound player is not in operation, it is determined whether or not a CD medium mounted on the disk drive 21 is in reproduction. When the CD medium is in reproduction, the operation is controlled to be stopped ((4-2 in FIG. 9), and the digital sound player application is initiated for reproduction ((5-2) in FIG. 9).

In reproduction processing after each player has been initiated, a "reproduction stop" button, "forward skipping" button, "backward skipping" button, or the like included in the A/V control buttons 117 is operated, thereby enabling reproduction step, forward skipping, backward skipping or the like. In addition, a bass boost button 118 is operated to be depressed, whereby the output volume level of the low tone from the sub woofer 112 can be switched.

As has been described above, according to the first embodiment, in a computer having a function for reproducing data stored in a hard disk or a memory card and a function for reproducing data stored in an optical disk medium such as a CD, there can be achieved a well operable reproduction mechanism capable of easily and speedily carrying out a switching a target to be reproduced or reproduction mode with a simple operation. In addition, there can be achieved a reproduction function with its improved operability, capable of audio data reproduction or switching operation of a target to be reproduced only by operation of a hardware switch (the mode control switch 116) provided at a predetermined position of a main frame of the computer main body.

Other embodiments of the computer according to the present invention will be described. The same portions as those of the first embodiment will be indicated in the same reference numerals and their detailed description will be omitted.

Second Embodiment

FIG. 10 is a flow chart showing procedures for executing an audio data reproduction function of a personal computer according to the second embodiment. Although the first embodiment presumes that only CD is inserted into the CD/DVD drive 21, the present embodiment presumes that a DVD is also be inserted.

Because of this, in connection to the flow chart shown in FIG. 8, a step of determining whether or not a medium inserted into the CD/DVD drive 21 is a CD and the DVD player reproduction step are added. That is, in the case where it is determined that the digital sound player is not in reproduction at step S22, or alternatively, after the digital sound player is stopped at step S24, it is determined at step S40 whether or not the medium inserted into the CD/DVD drive 21 is a CD. Only in the case of a CD, the CD player is initiated at step S26. In the case of a DVD, the DVD player is initiated at step S42. At step S28, unlike FIG. 8, it is determined whether or not a CD or DVD is in reproduction. In the case where the CD or DVD is in reproduction, the CD or DVD player is stopped at step S30.

Figure 11:
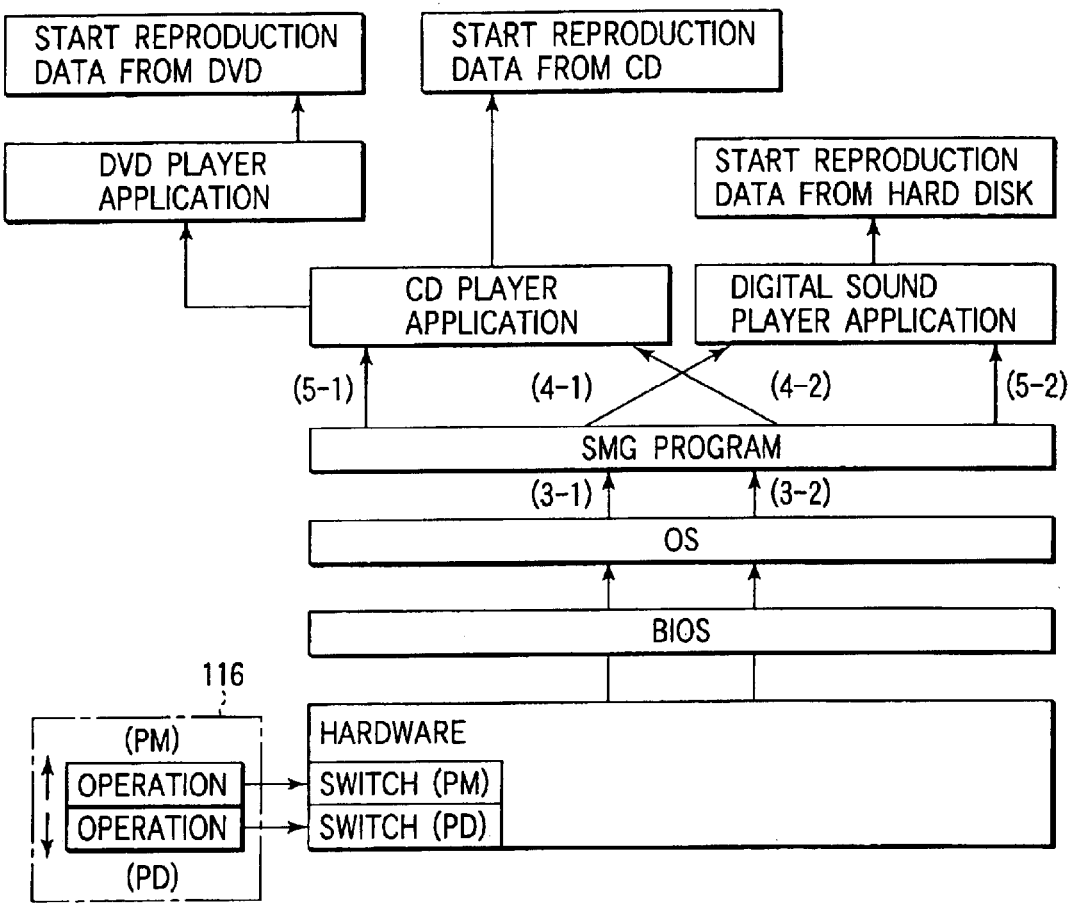
FIG. 11 is a view showing a flow of reproduction processing according to the second embodiment.

FIG. 11 is a view showing a flow of reproduction processing in the second embodiment. When the mode control switch 116 is operated during system operation, the switch operation is notified from the BIOS to the SMG program via the OS. Upon the receipt of the above notification, the SMG program initiates a player application program (CD player application/DVD player application/digital sound player application) targeted to be reproduced in accordance with the contents of operation of the switch 116.

Specifically, when the mode control switch 116 is operated, the switch operation state is notified from the BIOS to the SMG program via the OS, and the SMG program inquires the BIOS for the contents of switch operation (inquires a switch operation event). It is recognized whether or not the current mode is a CD/DVD reproduction mode (operating the operating knob 116a to be set to the slide position PM in left direction) or an MP3 reproduction mode (operating the operating knob 116a to be set to the slide position PD in right direction).

If the current mode is the CD/DVD reproduction mode, it is determined whether or not a disk medium is in reproduction. Otherwise, it is determined whether or not a digital sound player is in reproduction operation (in reproduction operation under the control of a digital sound player application program). When the digital sound player is in reproduction operation, the operation is controlled to be stopped, and a CD player (a CD player application program) or a DVD player (a DVD player application program) is initiated for reproduction in accordance with the type of the mounted medium recognized at the controller side of the CD/DVD drive 21.

In addition, when the current mode is the MP3 reproduction mode, it is determined whether or not the digital sound player is in operation. Otherwise, it is determined whether or not the disk mounted on the CD/DVD drive 21 is in reproduction. When the disk is in reproduction, the operation is controlled to be stopped, and a digital sound player application is initiated for reproduction.

In the second embodiment as well, in reproduction processing after each player has been initiated, the "reproduction stop" button, "forward skipping" button, and "backward skipping" button or the like included in the A/V control buttons 117 are operated, thereby enabling reproduction stop, forward skipping, backward skipping or the like relevant to each reproduction target (CD/DVD/digital sound player). The bass boost button 118 is operated to be depressed, whereby the output volume level of the low tone from the sub woofer can be switched.

In the second embodiment as well, the same advantageous effect as that of the first embodiment can be achieved.

Third Embodiment

Figure 12:
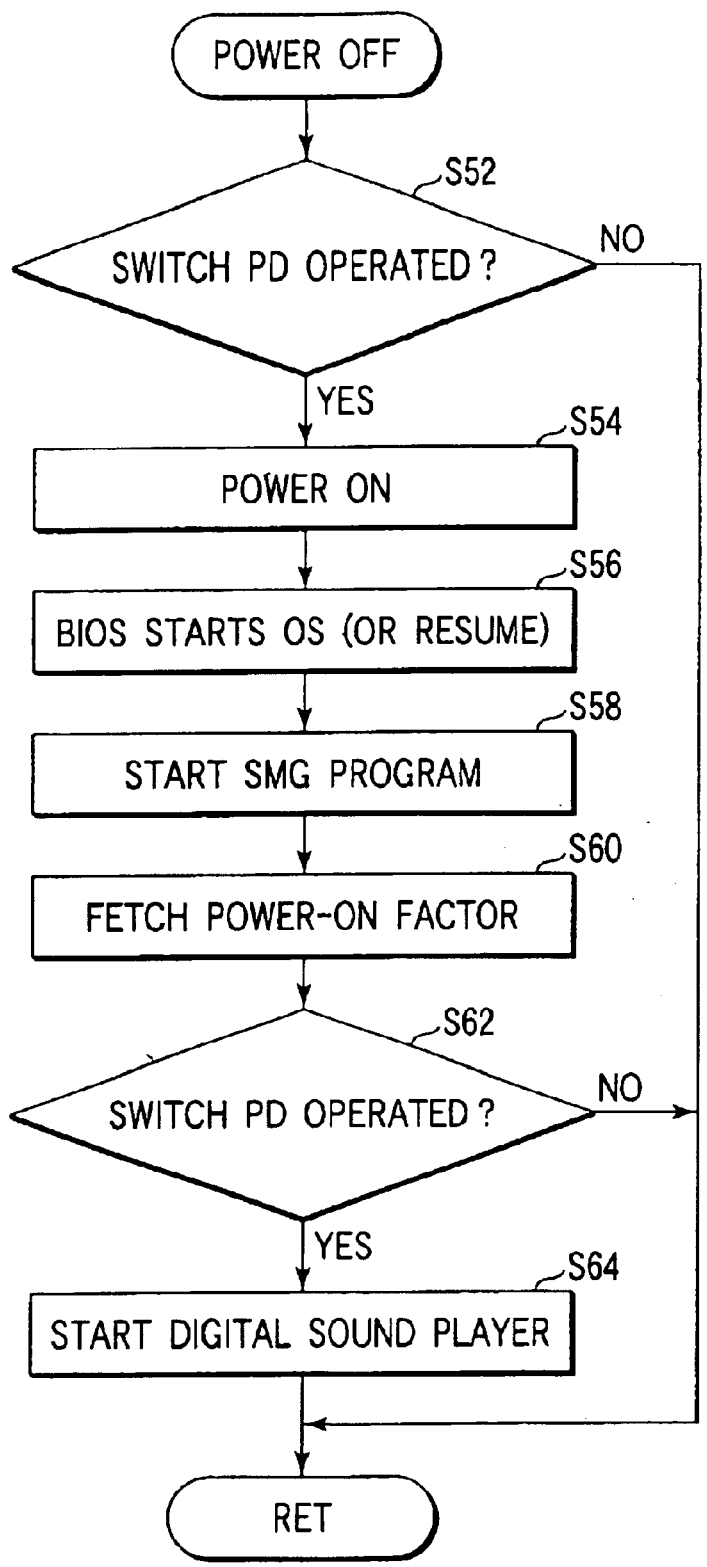
FIG. 12 is a flow chart showing procedures for executing an audio data reproduction function of a personal computer according to a third embodiment of the present invention.

FIG. 12 is a flow chart showing procedures for executing an audio data reproduction function of a personal computer according to the third embodiment. FIG. 12 shows reproduction processing when the operating knob 116a of the mode control switch 116 is operated to be set to the slide position PD in the right direction when a system is in a power off state, a standby state, or a pause state, and reproduction processing of audio data, such as MP3 data, stored in the hard disk or memory card is executed.

Figure 13:
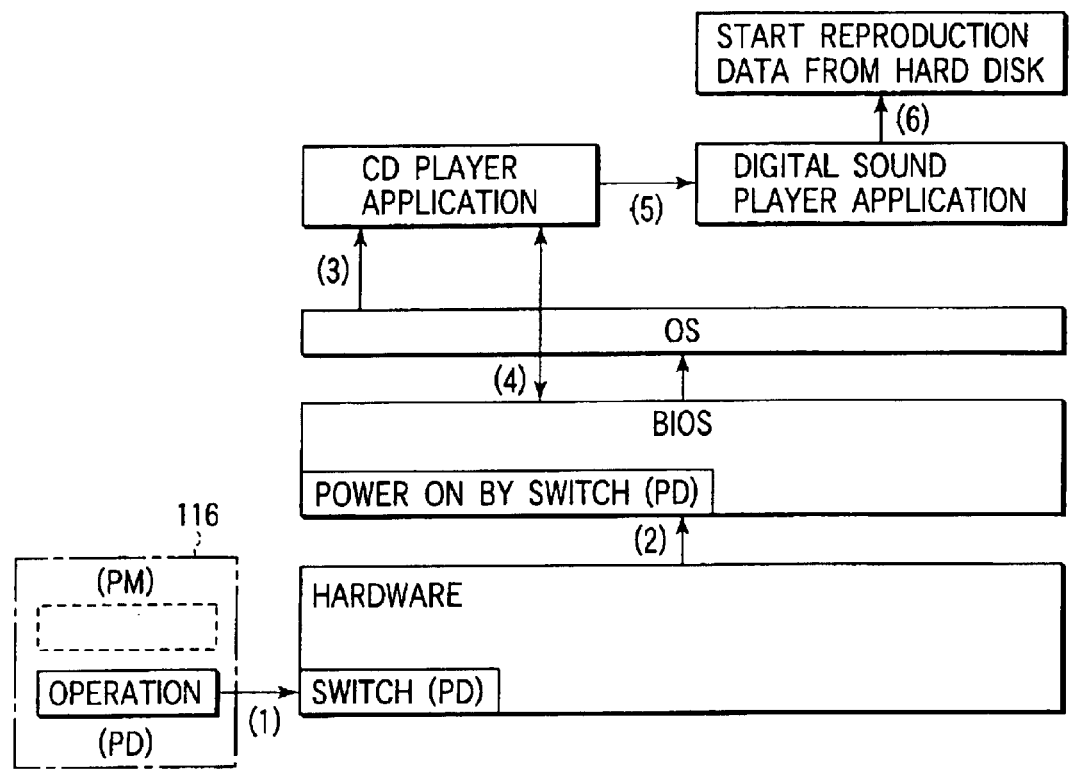
FIG. 13 is a view showing a flow of reproduction processing according to the third embodiment.

FIG. 13 is a view showing a flow of reproduction processing according to the third embodiment. When the mode control switch 116 is operated (the operating knob 116a is operated to set to the slide position PD in the right direction) when the system is powered off, the system is powered on, and the BIOS initiates the system. At this time, the BIOS stores the fact that the system is activated due to an operation of the mode control switch 116. The system is activated, and the OS is initiated, whereby an SMG program processing is executed. In this SMG program processing, when the activation factor of this system is inquired to the BIOS ((4) in FIG. 13), and it is recognized that the activation factor is due to an operation of the mode control switch 116, a digital sound player targeted for reproduction and driving (a digital sound player application program) is initiated.

Although the slide type momentary switch 116 as shown in FIG. 4 is used as a switch for starting reproduction of data stored in the hard disk or memory card, for example, a variety of switches such as push-type push switch is applicable without being limited to this momentary switch.

The third embodiment will be described in detail with reference to FIGS. 12 and 13. When the system power is in a power off state, a standby state, if a pause state, the mode control switch 116 is operated, and reproduction of data stored in the hard disk or memory card is instructed (step S52 in FIG. 12 and (1) in FIG. 13), the system is powered on (step S54). Then, this system is powered on, whereby the BIOS is initiated and the OS is activated (or resume processing is executed) (step S56 in FIG. 12 and (2) in FIG. 13). At this time, the BIOS stores the fact that the system is activated by operation of the mode control switch 116 for the purpose of inquiry from the SMG program.

When the OS is initiated (or resume processing is executed), and the system is activated, an SMG program processing is executed (step S58 in FIG. 12 and (3) in FIG. 13).

In this SMG program processing, the system activation factor is first inquired for the BIOS, and the system activation factor is acquired from the BIOS (step S60 in FIG. 12 and (4) in FIG. 13).

It is determined whether or not the system activation factor is due to an operation of the mode control switch 116 from the acquired contents (step S62). When it is recognized that the activation factor is due to an operation of the mode control switch 116, the digital sound player targeted for reproduction (a digital sound player application program) is initiated (step S64 in FIG. 12 and (5) in FIG. 13).

In this manner, the digital sound player is initiated, and a digital sound reproduction processing is started ((6) in FIG. 13).

In this way, when the system is in a power off state, a standby state, or a pause state and the like, a digital sound reproduction processing for digital sound data, such as MP3 data, stored in the hard disk or memory card is executed by operating an MP3 data reproduction switch (the mode control switch 116 in this example) only. Specifically, after system activation, it is recognized that the SMG program is powered on by operation of the mode control switch 116, and the digital sound player is initiated.

With such a reproduction control function, reproduction of digital audio data such as MP3 data stored in the hard disk or memory card can be carried out only by a single switch operation irrespective of a computer state.

According to the third embodiment, by operation of a specific mode control switch, there can be provided a computer achieving a function of reproducing and controlling digital audio data irrespective of whether the system is active or inactive, a method for reproducing digital audio data in the computer, and a storage medium. In addition, there can be provided a computer having an audio data reproduction function, and capable of easily and speedily making reproduction of digital audio data or a switching operation of a reproduction target irrespective of whether the system is active or inactive. In addition, in a computer having a function for reproducing digital audio data stored in the hard disk or memory card and a function for reproducing audio data from an optical disk medium, there can be provided an excellent operability capable of easily and speedily making an instruction for reproducing each of the reproduction functions or an instruction for switching target data for reproduction with a simple operation irrespective of whether or not the system is active or inactive.

Fourth Embodiment

Figure 14:
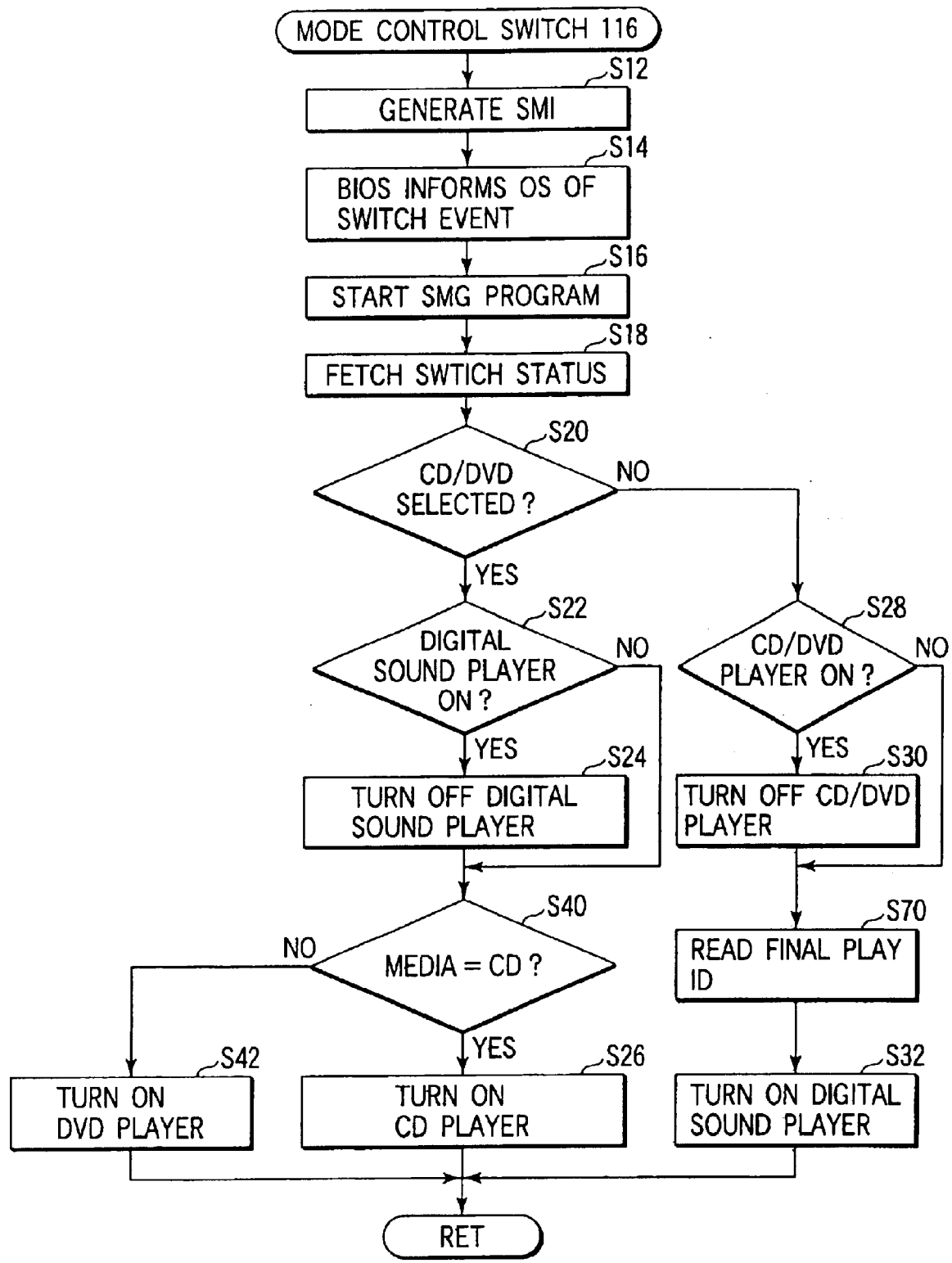
FIG. 14 is a flow chart showing procedures for executing an audio data reproduction function of a personal computer according to a fourth embodiment of the present invention.

FIG. 14 is a flow chart showing procedures for executing an audio reproduction function of a personal computer according to the fourth embodiment of the present invention. Before initiating a digital sound player relevant to a flow chart according to the second embodiment shown in FIG. 10, step S70 of reading ID information on a file reproduced at the end of the final reproduction maintained in a register region of the main memory 202 described above is added, and at step S32, a point of starting reproduction from a file specified in accordance with the ID information is merely changed.

With such a reproduction function, in a computer having an audio data reproduction function and a CD/DVD reproduction function, there can be achieved a reproduction mechanism capable of easily and speedily making instruction for reproducing each reproduction function or an instruction for switching reproduction target data with a simple operation. In addition, a reproduction function with its improved operability capable of audio data reproduction or a switching operation of reproduction target data can be achieved only by operation of a mode control switch (the mode control switch 116) provided at the main frame of the computer main body.

Fifth Embodiment

Figure 15:
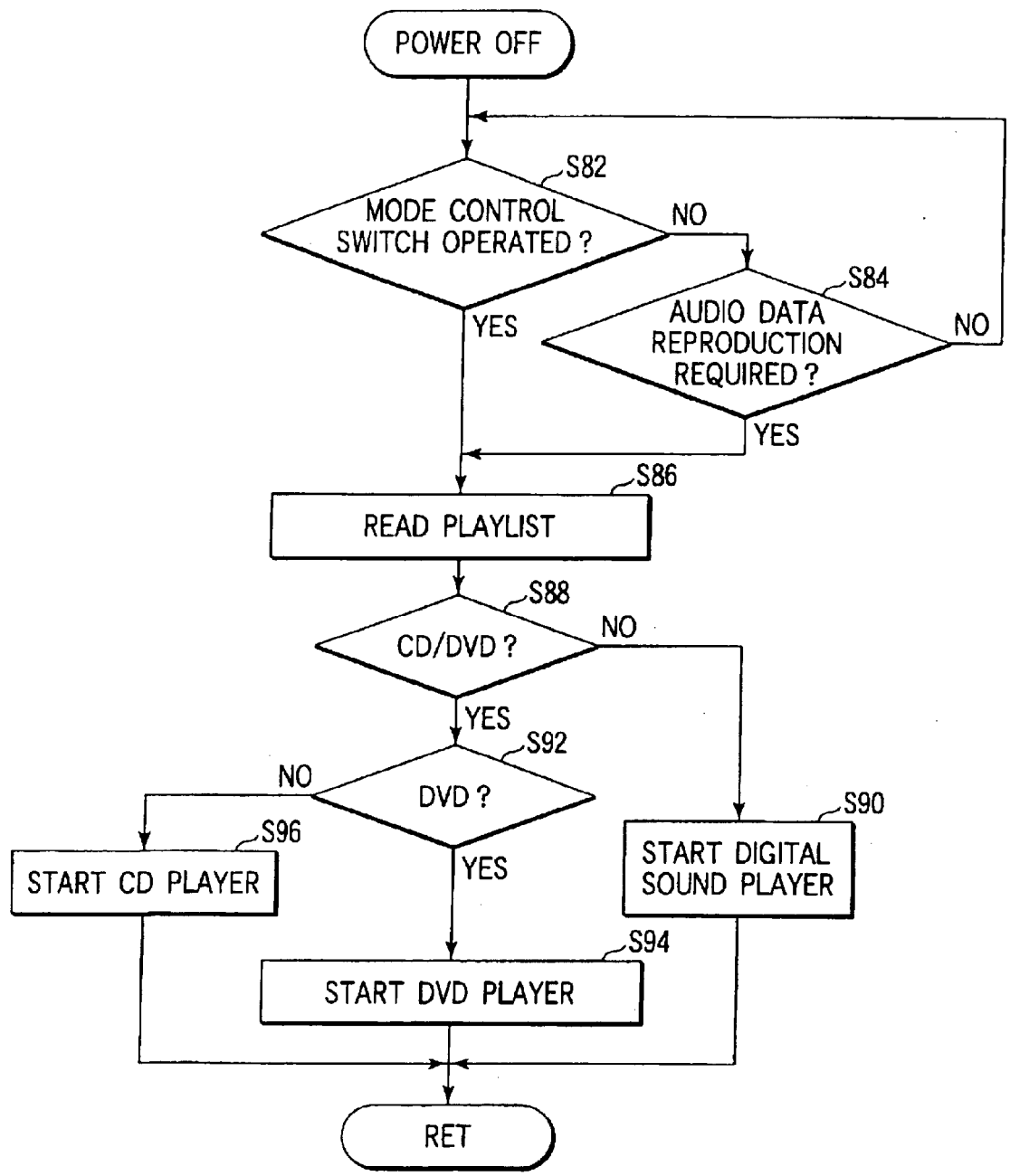
FIG. 15 is a flow chart showing procedures for executing an audio data reproduction function of the personal computer according to the fifth embodiment.

A fifth embodiment will be described with reference to a flow chart shown in FIG. 15. In the present embodiment, when the above described mode control switch 116 is operated to be set to any slide position (step S82) or when another mode control switch indicating audio reproduction is depressed (step S84), a play list is referred to (step S86), and the corresponding player is initiated in accordance with the contents of registration of that play list (steps S90, S94 and S96). Individual processing is similar to the embodiments described above with respect to individual processing. A detailed description will be omitted here.

In the fifth embodiment as well, in a computer having an audio data reproduction function and a CD/DVD reproduction function, there can be achieved a sound reproduction mechanism capable of easily and speedily making instruction for reproducing each of the reproduction functions or instruction for switching reproduction target data with a simple operation. In addition, there can be achieved a reproduction function with its improved operability capable of making audio data reproduction or an operation for switching reproduction target data by operation only of a single mode control switch (the mode control switch 116 or another mode control switch) provided at the main frame of the computer main body.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, although each of the embodiments has been described solely, a plurality of embodiments may be combined properly.

In addition, the present invention can be carried out as a computer readable recording medium having recorded therein a program for causing a computer to carry out the above described function.

What is claimed is:

1. A computer comprising:

means for storing audio data including at least one of a hard disk and a semiconductor memory;

first reproducing means for reproducing the audio data stored in the means for storing;

second reproducing means for reproducing audio data stored in an optical disk medium;

a selector which selects one of the means for storing and the optical disk medium;

means for activating the computer by selection operation of said selector when the computer is powered off, is in a standby state, and in a pause state; and control means for detecting an activation factor at a time of computer activation, and, when the activation factor is due to a selection operation of the selector to select the means for storing, initiating said first reproducing means, and when the activation factor is due to a selection operation of the selector to select the optical disk medium, initiating said second reproducing means, and wherein said first reproducing means comprises means for reproducing the audio data in accordance with a play list for specifying a reproduction order of the audio data, and means for acquiring identification information on the audio data that has been reproduced immediately before, at the end of reproduction operation, and storing the acquired identification information at the start of a next reproduction, and wherein said control means comprises means for starting reproduction from audio data according to the stored identification information when said control means initiates said first reproducing means, wherein said selector comprises a slidable momentary switch including an operating knob which is restored to a neutral position when no load is applied and slid to two directions to select the means for storing and the optical disk medium.

* * * * *